March 24, 1931.　　　C. W. JONES　　　1,797,611
SAW
Filed May 24, 1930　　　2 Sheets-Sheet 1
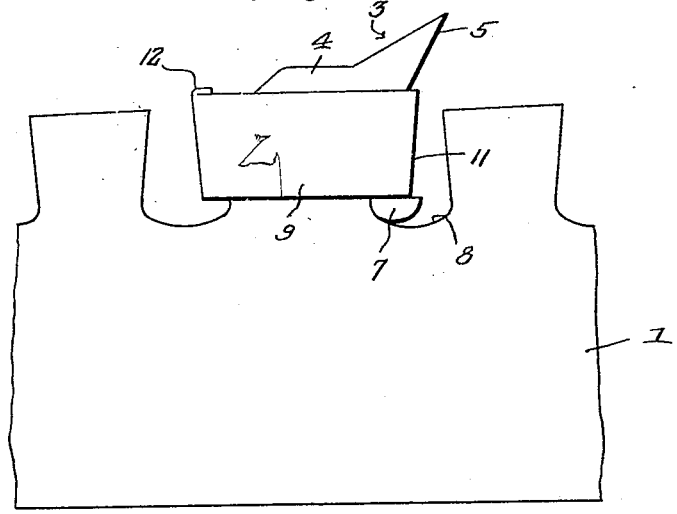
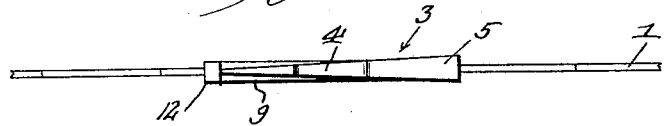
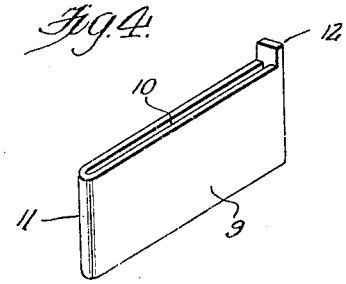
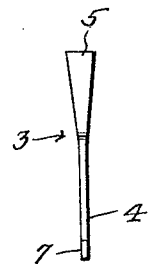
Inventor
Clyde W. Jones,
By *Clarence A. O'Brien*
　　　　　　　　Attorney March 24, 1931.   C. W. JONES   1,797,611
SAW
Filed May 24, 1930   2 Sheets-Sheet 2
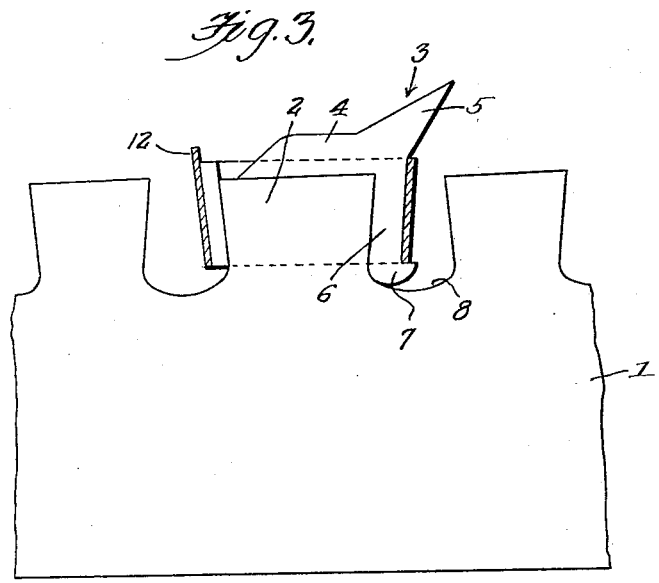
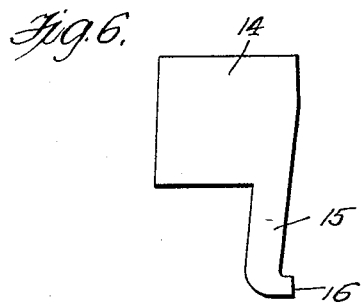
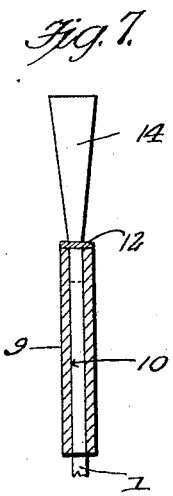
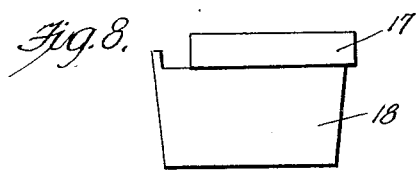
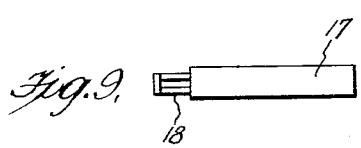
Inventor
Clyde W. Jones,
By Clarence A. O'Brien
Attorney Patented Mar. 24, 1931

1,797,611

UNITED STATES PATENT OFFICE

CLYDE W. JONES, OF BLOOMINGTON, INDIANA

SAW

Application filed May 24, 1930. Serial No. 455,320.

This invention relates to saws and more particularly to new and useful improvements in band saws but it is to be understood that the invention is not limited to any particular form of saw.

The primary object of the invention is to provide, in a manner as hereinafter set forth, a band saw having separate stone cutting teeth fitted and rigidly mounted thereon in such a manner that said teeth will not be displaced regardless of the severity of the use to which same may be put when in use.

Other objects of the invention are to provide a saw of the character described which will be comparatively simple in construction, strong, durable, efficient in its use and which may be manufactured at low cost.

All of the foregoing and still further objects and advantages of the invention may become apparent from a study of the following specification, taken in connection with the accompanying drawings wherein like characters of reference designate corresponding parts throughout the several views, and wherein:—

Figure 1 is a view in side elevation showing a portion of a band saw blade with a tooth mounted in position thereon.

Figure 2 is a top plan view thereof.

Figure 3 is a view showing the clamp in longitudinal section.

Figure 4 is a detail view in perspective of the clamp.

Figure 5 is a detail view in elevation looking at the forward end of the tooth.

Figure 6 is a detail view in side elevation of another form of tooth which is adapted to be mounted on the saw blade with the same securing elements which are used for securing the tooth illustrated in Figure 5.

Figure 7 is a view in cross section showing the tooth illustrated in Figure 6 mounted in position.

Figure 8 is a detail view in side elevation of another form of tooth, the same being shown formed integrally with the clamp.

Figure 9 is a detail view in top plan of the device illustrated in Figure 8.

Referring to the drawings in detail, it will be seen that the reference character 1 designates a portion of a band saw blade having formed integrally thereon the projections or tooth supports 2 the opposite edges of which diverge toward the free ends of the supports.

A tooth 3 is adapted to be mounted on the supports 2 and said tooth includes a longitudinally extending portion 4 adapted to seat on the free ends of the supports and terminating at its forward end in a diagonally projecting cutting point 5. The tooth further includes a depending shank or arm 6 the rear edge of which is disposed at an inclination corresponding to that of the forward edge of the supports with which said arm is in abutting engagement. The arm 6 is provided with an integral hook 7 at its free end disposed in the gullet 8.

A clamp 9 is provided for securing the tooth in position on the support and said clamp is provided with a longitudinally extending slot 10 for the reception of the tooth 3 and the supports 2. The clamp 9 further includes a rounded end 11 engageable with the forward edge of the arm 6 of the tooth and adapted for rest on the hook 7. The clamp further includes a flat rear end having formed integrally thereon an upstanding extension or tongue 12, said rear end being spaced rearwardly from the rear edge of the tooth supports 2 to provide a space for the reception of the locking key 13. It should be here mentioned that the rear wall or end of the clamp 9 is disposed at an inclination corresponding to that of the rear edge of the tooth supports 2 as clearly illustrated in Figure 3 of the drawings. After the locking key is driven home between the supports 2 and the rear end of the clamp 9, the extension 12 is bent thereover to secure the key in position.

In Figures 6 and 7 of the drawings, there is shown a tooth which is to be covered with carborundum and which is adapted particularly for use in cutting stone or marble and the same comprises a substantially rectangular body portion 14 adapted to seat on the free end of the tooth supports 2 and an integral arm 15 depending from the forward portion thereof at an angle corresponding to the inclination of the forward edge of the tooth supports upon which the same is mounted. As will be obvious, the depending arm 15 is disposed in abutting engagement with the forward edge of the tooth support and said arm terminates in a forwardly projecting integral hook 16. This tooth is mounted on the support in the same manner in which the wood cutting tooth 3 is mounted thereon, the same securing elements being used.

In Figures 8 and 9 of the drawings there is illustrated another form of tooth comprising a polygonal tooth portion 17 rigidly and permanently mounted on the clamp 18, said clamp 18 being identical in construction with the clamp 9. The clamp 18 is of a length to fit on the tooth support 2 in a manner to provide a space sufficiently only for the insertion of the locking key 13.

It is believed that the many advantages of a saw constructed in accordance with this invention will be readily understood, and although the preferred embodiment of the invention is as illustrated and described, it is to be understood that changes in the details of construction may be had which will fall within the scope of the invention as claimed.

What is claimed is:—

1. A saw of the character described comprising a blade having integral tooth supporting projections thereon, teeth mounted on the projections, clamping bands encircling the teeth and the projections, a locking key disposed between one side edge of the projections and the adjacent end walls of the bands in a manner to secure said bands in operative position, and bendable tongues formed integrally on the bands and engageable with the upper ends of the keys for retaining said keys in position.

2. A saw of the character described comprising a blade, integral tooth supporting projections on the blade having inwardly converging side edges, teeth disposed on the projections, elongated clamping bands encircling the teeth and the projections, the opposite ends walls of the bands disposed parallel with the side edges of the projections, a locking key secured between one edge of each projection and the corresponding end of each of the clamping bands for securing said bands on the projections and bendable tongues formed integrally on the bands and engageable with the keys for retaining said keys in position.

3. A saw of the character described comprising a blade, integral tooth supporting projections thereon having inwardly converging side edges, a tooth disposed in abutting engagement with the free end of each of the projections, an integral arm formed on the forward end portion of the tooth and disposed in abutting engagement throughout its length with one side edge of the projection, an integral hook formed on the free end of the arm, an elongated band encircling the arm and the projection, said band engaged for rest on the hook, the end walls of said band disposed in parallelism with the side edges of the projection, a locking key secured between the rear edge of the projection and the rear end wall of the band in a manner to secure said band in operative position, and a bendable tongue formed integrally on each band and engageable with the upper ends of the keys for retaining said keys in position.

4. A saw of the character described comprising a blade, integral tooth supporting projections on the blade, teeth disposed on the free end of the projections, an elongated band formed integrally with the teeth and disposed over the projections, said band projecting beyond one end of the teeth, and a locking key secured between the projecting end wall of the band and the adjacent edge of the projections.

5. A saw of the character described comprising a blade, integral tooth supporting projections on the blade, teeth disposed on the free end of the projections, an elongated band formed integrally with the teeth and disposed over the projections, said band projecting beyond one end of the teeth, and a locking key secured between the projecting end wall of the band and the adjacent edge of the projections, the opposite edges of the projections diverging outwardly and the opposite end walls of the band disposed in parallelism therewith.

6. A saw of the character described comprising a blade, integral tooth supporting projections thereon having inwardly converging opposite side edges, teeth mounted on the projections, integral arms depending from the teeth in edge to edge abutting engagement with the projections at one side thereof, clamping bands encircling the arms and the projections and extending beyond the free side edges of said projections, locking keys disposed in the bands between the extended ends thereof and the adjacent edges of the projections, and bendable retaining tongues on the clamping bands disposed over the keys for securing same in position.

7. A saw of the character described comprising a blade, integral tooth supporting projections on the blade having inwardly converging opposite side edges, elongated bands encircling the projections and extending beyond one of the side edges thereof in a manner to provide a space therebetween, a locking key disposed in each space, a retaining tongue on the extended end of each clamping band engaged with the key in a maner to secure same in position, and a tooth mounted on one end of each band.

8. A saw of the character described comprising a blade, integral tooth supporting projections on the blade having inwardly converging side edges, teeth removably mounted on the projections, elongated bands engaged with the teeth and removably encircling the projections for securing the teeth thereon, one end portion of the bands projecting beyond one side edge of the projection, the end wall of said end portion of the band being disposed in spaced, opposed parallel relation to said one side edge of the projections, locking keys disposed in the projecting end portions of the bands and engaged with the projections in a manner to secure the bands thereon, and bendable tongues on the bands engageable with the upper ends of the locking keys for securing said locking keys in position.

In testimony whereof I affix my signature.

CLYDE W. JONES.